Figure 1:
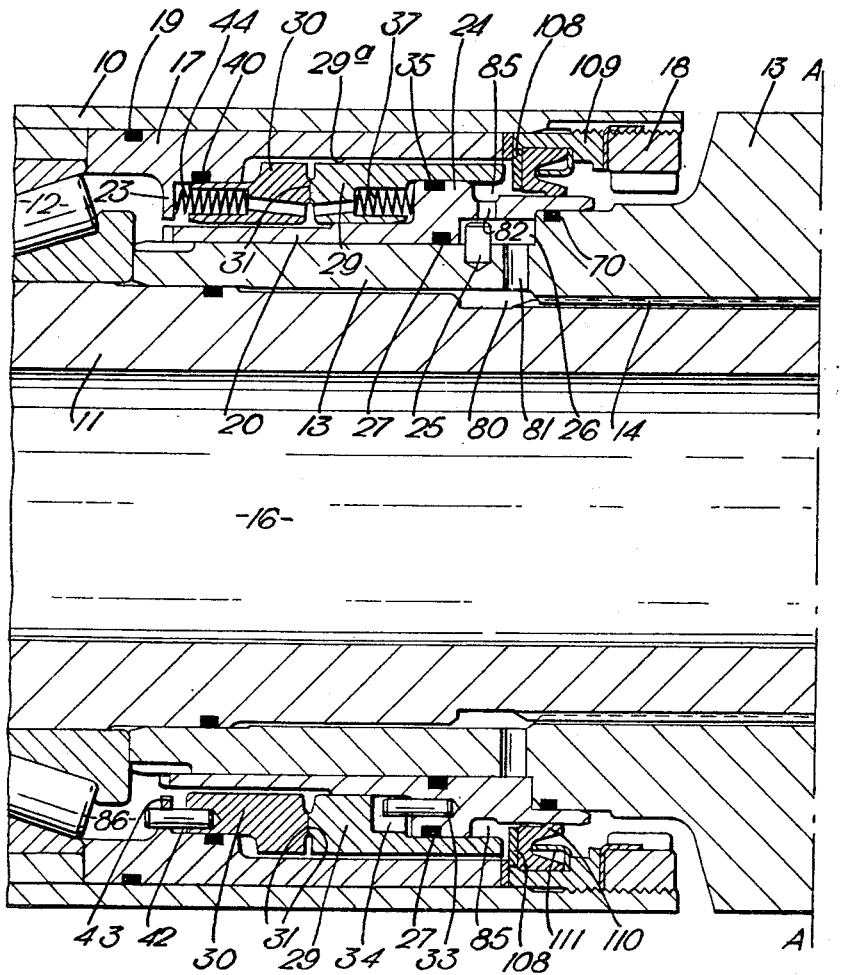

United States Patent Office 3,395,955
Patented Aug. 6, 1968

3,395,955
SEALS BETWEEN ROTATING PARTS
Stanley Walter Mansell and Francis Charles Ivor Marchant, Bristol, England, assignors to Bristol Siddeley Engines Limited, Bristol, England, a British company
Filed July 28, 1966, Ser. No. 568,632
Claims priority, application Great Britain, July 28, 1965, 32,302/65
7 Claims. (Cl. 308—187)

This invention relates to mechanical seals for preventing passage of fluid between relatively rotatable parts, of the kind comprising relatively rotatable coaxial first and second sealing elements with cooperating primary sealing faces which are seperable by relative axial movement of the sealing elements, means restraining rotation of each element relatively to a respective one of the parts, and secondary sealing means acting between each sealing element and its respective part. In such seals the elements are pressed together with their sealing faces in contact with one another by springs or magnetic attraction, and the force may be augmented by pressure derived from the fluid being contained.

This invention relates to seals of the kind specified above, for use where the parts, to one side of the primary sealing faces are in contact with a harmful ambient fluid which may be abrasive or corrosive. Such situations arise notably in rock drilling equipment of the turbodrill type for sinking deep holes, where there is lubricant in a space between two relatively rotatable concentric parts, drilling fluid hereinafter called mud within the inner part, and debris-carrying mud around the outer part. Similar situations may arise, for example, in pumps.

According to the present invention the primary sealing faces of a seal of the kind specified in paragraph 1 are protected from ambient fluid by an intermediate fluid in a space extending from one side of the primary sealing faces to one side of a seal member acting between the relatively rotatable parts, the other side of the seal member being exposed to ambient fluid, and the space being bounded in part by one side of a flexible wall, the opposite side of which is exposed to the ambient fluid.

It will be apparent that, subject to minor discrepancies due to inertia and stiffness of the flexible wall, the intermediate fluid will be at the same pressure as the ambient fluid. Thus there will be no significant pressure difference tending to cause any leakage of ambient fluid past the seal member towards the primary sealing faces, and this is so whether the opposite side of the primary sealing faces is exposed to a fluid at a pressure higher or lower than that of the ambient fluid. Preferably the intermediate fluid is a lubricant.

One of the sealing elements is preferably axially slidable under pressure of the intermediate fluid so as to clamp the primary sealing faces together and prevent escape of the intermediate fluid between the sealing faces whenever the ambient fluid is at a pressure higher than the pressure on the other side of the primary sealing faces.

Preferably the other side of the primary sealing faces communicates with a reservoir of fluid which under a certain condition of operation supplies such fluid to the primary sealing faces at a pressure which is greater than that of the intermediate fluid.

The essential features of a turbodrill according to the present invention are that there is a lubricated bearing protected by a face seal from drilling mud, the face seal being in turn protected by a mud-pressurised body of oil between the face seal and a secondary seal having one side exposed to the drilling fluid.

Figure 2:
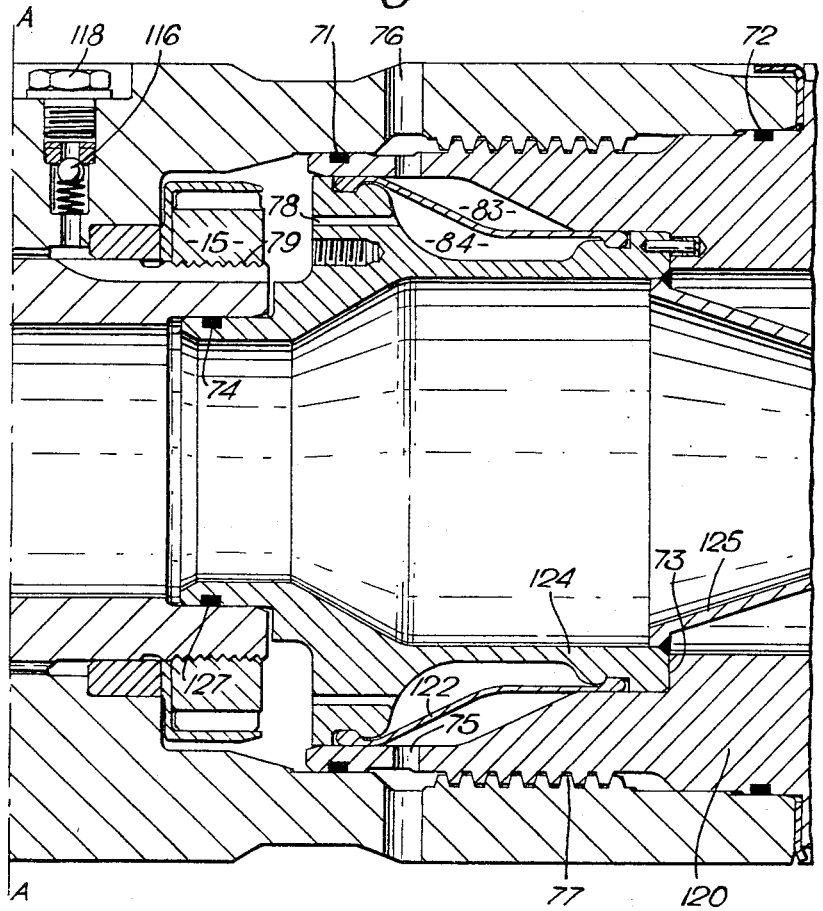
Figure 3:
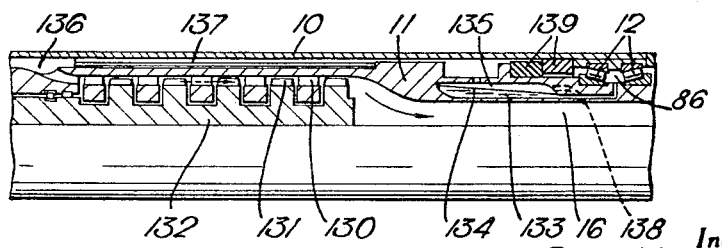

The accompanying drawings show one example of a turbodrill including a combination according to the present invention. In these drawings:

FIGURES 1 and 2, if joined at the line A—A, form a section passing through the axis of a seal assembly mounted between the casing and shaft of a trubodrill motor for drilling oil wells; and FIGURE 3 is a section passing through the axis of parts upstream of those in FIGURE 1, on a smaller scale.

The axis is of course vertical during normal operation, the assembly being drawn in a horizontal position for convenience.

The casing 10 of the turbodrill motor has a shaft 11 journalled in it by means of taper roller bearings 12 (FIGURES 1 and 3) which also take the thrust of a drill bit, which is attached to the shaft through a coupling member 13 (FIGURES 1 and 2), connected to the shaft by splines 14 and a locking nut 15. The shaft 11 has a bore 16 through which drilling fluid at high pressure is supplied to the drill bit in the usual way. The shaft 11, as shown in FIGURE 3, has internal turbine blades 130 cooperating with external blades 131 on a shaft 132, which is coupled to the shaft 11 by gearing, not shown. The bearings 12, and other bearing means further to the left, not shown in FIGURE 3, run in lubricating oil, which may be maintained at a pressure equal to or greater than that of the drilling fluid in the bore 16, as described below, and escape of which has to be prevented by a sealing assembly between the casing 10 and the unit constituted by the shaft 11 and the coupling member 13.

The sealing assembly comprises an outer sleeve 17 which is locked firmly in the casing 10 against the outer race of the bearing 12 by a locking ring 18, an O ring 19 being provided to prevent leakage at the interface, and an inner sleeve 20 which is mounted on an external surface of the coupling member 13. The outer sleeve 17 has at its upper end (i.e., its left hand end as seen in the drawing) a radial flange 23 projecting inwards towards the inner sleeve 20, while the latter has at its lower end a radial flange 24 projecting outwards towards the outer sleeve 17. The inner sleeve is prevented from rotating relatively to the coupling member 13 by a number of pins 25 engaging slots 26 in the inner sleeve, and leakage is prevented by an O ring 27. The flanges 23 and 24 and the sleeves together substantially enclose a cavity in which are mounted a sealing element 29 which rotates with the inner sleeve 20 and shaft 11 and a sealing element 30 which is nonrotatable relatively to the outer sleeve 17 and the casing 10. The sealing elements have similar but oppositely directed primary sealing faces 31.

The rotating sealing element 29 has an inner cylindrical bore by which it is located on the inner sleeve 20 with freedom to slide axially, rotation relatively to the sleeve being prevented by a number of dowels 33 (see the lower half of the drawing) mounted in the flange 24 and engaging slots 34 in the sealing element 28. The flange 24 also has a peripheral groove housing a second seal O ring 35 which engages a cylindrical bore in the sealing element 29. A number of low rate springs 37 housed in recesses (see the upper half of the drawing) and reacting against the flange 24 urge the sealing element 29 upwards towards the other element. The outer periphery of the element 29 has a clearance spacing from the sleeve 17 which forms a channel 29a.

The non-rotating sealing element 30 has an outwardly facing cylindrical secondary sealing face by which it is slidably located in a bore in the outer sleeve 17, an O ring 40 being interposed to provide the secondary seal. The element 30 is prevented from rotating in the outer sleeve by a number of dowels 42 carried by the element and projecting into slots 43 in the flange 23. Low rate springs 44 housed in bores in the element 30 and reacting against the flange 23 urge the element into contact with the other element 29, the two sets of springs being of selected strengths, having regard to the weight of the elements 29 and 30 acting downwards when the drill is in operation, to position the elements about half way along their range of free axial movement and to provide an adequate sealing pressure between the elements in the absence of oil pressure.

The inner sleeve 20 extends downwards as an open-ended cylinder sliding between an O ring seal 70 on the rotating shaft coupling 13 and a nonrotating lip seal member 110 which also seals against a fixed sleeve 109 clamped to the drill casing 10. The lip seal member 110 is axially constrained by a backing plate 108 and by a retainer ring 111. There is thus an annular cavity 85 extending outwards to the radially inner side of the outer sleeve 17 and axially to the upper side of the backing plate 108 of the seal member 110.

Into the bottom end of the coupling member 13 is screwed a drill collar 120 sealed by O rings 71, 72. Within the top end of this collar a removable annular spigot member 124 is trapped axially between an abutment shoulder 73 in the collar 120 and the bottom end of the drill shaft 11 to which it is radially sealed by an O ring 74. To the bottom end of the removable spigot member 124 a mud strainer 125 is welded. Between the outside of the spigot member 124 and the inside of the threaded top end of the collar 120 an angular chamber 83, 84 is formed which is divided into approximately equal volumes by an axially disposed flexible oil-resisting neoprene diaphragm 122 of generally frusto-conical form trapped and sealed at both its beaded ends between the spigot member and the counterbore of the collar 120.

The chamber 83 radially outside the flexible diaphragm 122 communicates with the bore-hole annulus via holes 75 in the collar 120 and passages 76 in the coupling member 13 drilled at positions above the threads 77 and between the O rings 71, 72 which seal between the coupling and the collar. Thus, this radially outer space and the diaphragm 122 are subject to borehole mud pressure in all down-hole conditions, e.g., lowering, or circulating, or drilling. By "circulating" is meant passing mud through the drill while holding the drill off the bottom of the borehole, e.g., to clean out the borehole bottom or to test the mud pumping plant.

The chamber 84 radially inside the flexible diaphragm 122 communicates via axial passages 78 through the top end flange of the spigot member 124 with grooves 79 in the shaft 11, and thence, via the splines 14, with a cavity 80. This cavity is connected to the cavity 85 by passages 81, through the coupling member 13 and by holes 82 through the inner sleeve 24 between the O rings 27 and 70.

Thus the cavity 85, the cavity 80, and the chamber 84 are all part of a single space. This space is filled with oil which serves as "intermediate fluid" as referred to above. The filling is through a filler plug and ball-valve assembly 118, 116 in the coupling member 13.

The cavity 86 which contains the roller bearings 12, and which extends to the inner side of the primary sealing faces 31, is connected to a reservoir chamber 133 (FIGURE 3) the cavity 86 and the reservoir chamber 133 being filled with lubricating oil. The chamber 133 is part of a space divided by a flexible diaphragm 134, the rest of the space being a chamber 135. The chamber 135 is part of a path for a small flow of mud bypassing the turbine. This flow starts from a space 136 upstream of the turbine, passes through pressure reducer 137 composed of concentric annular layers of glass-fibre reinforced resin, thence to the chamber 135, and into the bore 16 downstream of the turbine via passages 138. Thus the pressure in the chamber 135, and thence the pressure of the lubricant in the chamber 133 and the space 86, is a little above the pressure downstream of the turbine, and is considerably above the pressure in the borehole outside the casing 10. For example the pressure in the space 86 may be 160 pounds per square inch above the pressure outside the casing 10. There is a face seal at 139 separating mud from lubricant.

During drilling, mud is pumped down through the turbine, and the inner sleeve 13 and the lower sealing element 29 rotate with the output shaft 11.

The oil from the reservoir above the main bearing, which is subjected to the high pressure of mud taken from upstream of the turbine, is forced downwards to reach the radially inner side of the face seal. At the same time this oil urges the inner sleeve 20 downwards (i.e. to the right in the drawing) as far as it will go. The sealing members 29, 30 are then free to float axially, constrained by springs 37, 44. These springs cushion the sealing elements 29, 30 against axial shocks.

The intermediate oil in the cavity 85 is at the lower pressure of the debris-carrying mud outside the drill in the borehole annulus, acting on the flexible diaphragm 122.

Thus there is no tendency for mud to leak upwards past the seal member 110.

When there is slight leakage of oil from the cavity 86 the cavity 85 past the primary sealing faces 31, the effect is to gradually displace the flexible diaphragm 122 outwards. When, for example during charging of the lower reservoir 84, the diaphragm reaches the end of its travel, the oil may leak downwards at a very slow rate past the lip of the seal member 110 which thus acts as a relief valve. This leaking oil serves to lubricate the lip where it contacts the inner sleeve 20.

During lowering of the drill into a borehole, a process known as "running in," the conditions are different. Borehole mud pressure acts on the flexible diaphragm 122 to force oil from the chamber 84 along the splines 14 and into the cavity 85 between the sealing elements 29, 30 and the seal member 110. The pressure of this oil balances that of the borehole mud pressure acting on the seal member 110 from outside, thus minimising the pressure drop across the seal member and thereby opposing the entry of mud past it.

Simultaneously the oil at borehole mud pressure acting upwards against the lower end of the inner sleeve 20 urges the inner sleeve upwards against the pressure of the oil in the cavity 86 containing the bearing 12. This oil is at low pressure, because no mud is being pumped down to the turbine. Instead, mud is passing upwards through the turbine, losing pressure as it does so. Hence the sleeve 20 moves upwards as far as it can, thereby clamping the sealing elements 29, 30 together and thus preventing loss of intermediate oil to the adjacent bearing 12 via the primary sealing faces 31.

It will thus be seen that the sealing members 29, 30 are completely immersed in lubricant and are isolated from contact with the borehole mud in all down-hole conditions of lowering or circulating or drilling. Moreover the seal member 110 is not subject to any large pressure differences during any down-hole conditions and is thereby enabled to fulfill its function reliably of excluding borehole mud from the cavity 85. The seal member 110 also acts as an oil relief valve, when the oil system between the member 29, 30 and the diaphragm 122 is completely full, with the diaphragm distended against the counterbore of the collar 120, because either oil charging is complete, or oil is leaking past the faces 31. The spigot member 124 and strainer 125 and diaphragm 122 are together readily removable from the collar 120 for inspection and cleaning. The splines 14 coupling the drill shaft 11 and the output coupling 13 are maintained immersed in oil and are thus protected from the borehole mud.

We claim:

1. A combination of relatively rotatable first and second parts, relatively rotatable coaxial first and second sealing elements with cooperating primary sealing faces which are separable by relative axial movement of the sealing elements, means restraining rotation of each element relatively to a respective one of the parts, secondary sealing means acting between each sealing element and its respective part, a space extending from one side of the primary sealing faces to one side of a seal member acting between the relative rotatable parts, the other side of the seal member being exposed to ambient fluid, and the space being bounded in part by one side of a flexible wall, the opposite side of which is exposed to the ambient fluid.

2. A combination according to claim 1, in which the seal member is a lip seal member.

3. A combination according to claim 1, in which the space is full of an intermediate fluid, and one of the sealing elements is axially slidable under pressure of the intermediate fluid so as to clamp the primary sealing faces together and prevent escape of the intermediate fluid between the sealing faces whenever the ambient fluid is at a pressure higher than the pressure on the other side of the primary sealing faces.

4. A turbodrill including a combination according to claim 3, the two parts having portions which in use are exposed to drilling mud, and a lubricated bearing between the parts, the primary sealing faces lying between the bearing and the mud, and the seal member lying between the primary sealing faces and the mud, the intermediate fluid being oil, which, via the flexible wall is subjected to the pressure of the mud.

5. A turbodrill according to claim 4, in which the two parts are a motor casing and a motor shaft, and there is a drill collar connected to the motor shaft, and the space containing the intermediate fluid includes a part of the cavity within the drill collar, the cavity being divided by the flexible wall, and the other part of the cavity being in communication with the exterior of the drill collar.

6. A turbodrill according to claim 4, in which the bearing communicates with lubricant in a chamber having a flexible wall which, during operation of the turbodrill in a borehole, is acted on by drilling mud at a pressure above the pressure of mud in the borehole.

7. A turbodrill including a lubricated bearing protected by a face seal from drilling mud, the face seal being in turn protected by a mud-pressurised body of oil between the face seal and a secondary seal having one side exposed to the fluid.

References Cited

FOREIGN PATENTS 538,429   9/1954   Italy.

MARTIN P. SCHWADRON, *Primary Examiner.*

FRANK SUSKO, *Assistant Examiner.*